United States Patent Office 2,844,815
Patented July 22, 1958

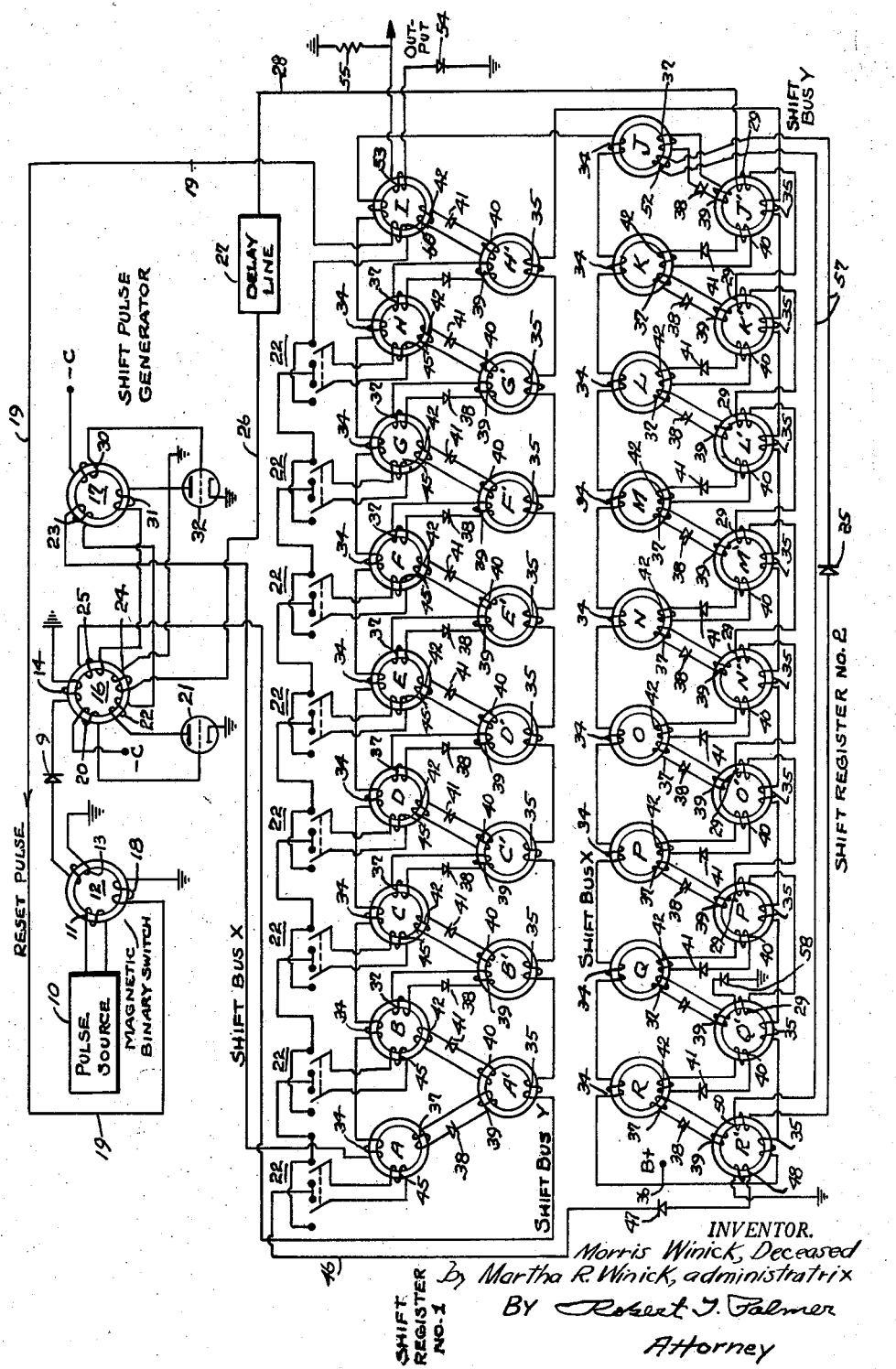

2,844,815

BEACON CODERS

Morris Winick, deceased, late of Belmont, Mass., by Martha R. Winick, administratrix, Belmont, Mass., assignor to American Machine & Foundry Company, a corporation of New Jersey Application October 26, 1953, Serial No. 388,362

11 Claims. (Cl. 340—354)

This invention relates to beacon coders and has as an object the reduction of the number of vacuum tubes and of the stand-by power supplies used in beacon coders.

Radar beacons are widely used for the recognition of objects. For example, the IFF system sends a pulse challenge signal from a station to an airplane or ship within its range, and equipment on a friendly airplane or ship receives the challenge and automatically transmits a signal in the form of a prearranged code to the station. Beacons are also used to accept radar signals from an approaching airplane and then to radiate a coded signal which indicates to the airplane navigation aid in the form of range and direction. Beacons are also contemplated for the handling of airplnae landings at congested airports.

Upon receipt of an interrogating pulse, a beacon coder provides a series of pulses at its output, each of which causes the beacon to transmit a pulse. The interval between successive pulses may be short (e. g. 15 microseconds) or it may be long (30 microseconds). The first output pulse appears shortly after as the interrogating pulses and is called the ranging pulse, since its transmission by the beacon provides range information to the interrogator. When the long interval is to be twice the duration of the short interval, it is possible to achieve the desired result by generating a train of pulses equally separated in time by the short interval and then selecting only those pulses that constitute the code. The first pulse appears shortly after the interrogating pulse. In order to prevent interference with the operation of the coder, provision must be made to desensitize the input of the coder from the time an interrogating pulse is received until the entire code is transmitted.

Prior beacon coders have been electronic, employing chains of regenerative trigger circuits arranged in tandem and so connected that one will fire the next in order after a predetermined delay. This delay may be either short or long and is determined by a switch that is part of each stage. The trigger circuits are connected to an output bus. Thus if a chain is activated by applying a trigger to its input, a pulse will step down the line, energizing the output bus to produce the code.

Such prior coders have, in order to prevent interference with the operation of the coders, had "one shot multivibrators" and diodes preceding them for providing gates having greater durations than the codes. Standby power for such a gate circuit is required usually for three filaments and one plate circuit. Each trigger circuit of such prior coders has included a "one-shot multivibrator" including at least a dual-triode tube requiring standby power for its filament and the plate of the conducting side. A separate trigger circuit is required for every digit in a code so that when large numbers of digits are involved correspondingly large numbers of vacuum tubes are required.

In general, the number of unique codes desired for an airborne or portable beacon, far exceeds the number desired in fixed beacons which are used as aids to navigation. As a result, simpler, smaller and lighter coders than previously have been provided are needed. This invention fills such a need.

This invention uses magnetic binaries instead of multivibrators for providing the digits in a coder, and requires only two triode vacuum tubes or their equivalent, such as "transistors," and the necessary standby power for their filaments. As the number of digits in a code is increased, more magnetic binaries are required, and the size of the tubes may have to be increased, but the number of tubes required remains at two. The gate circuit is replaced by a pulse operated magnetic binary switch.

In the embodiment of the invention described herein, a magnetic binary is used for a switch at the entrance to the coder; a first magnetic binary shift register is used to store the code symbol; a second magnetic binary shift register is used to recycle the shift pulse generator, to close the magnetic binary switch and to reset the first magnetic binary shift register after the code has been delivered from it, and the shift pulse generator uses two magnetic binaries and two vacuum tubes to deliver shift pulses to the two shift registers.

Magnetic binary shift registers and the magnetic binaries used therein are fully described in an article by An Wang and Way Dong Woo published on pages 49–54 of volume 21, the January 1950 issue, of the Journal of Applied Physics. It is believed, therefore, that it is not necessary in the present disclosure, to give more than the following brief description of magnetic binaries and shift registers employing same.

A magnetic binary core is capable of being magnetized to saturation in either of two directions. Two states are said to arise from the two directions: A positive or active state in which the direction of retentivity is opposite to that which would result from the application of a sensing or shift pulse to a shift winding on the core; and a negative, or inactive state in which the direction of retentivity is the same as that which would result from the application of a shift pulse. When applied to a core in the active state, a shift current pulse causes the inactive state to appear. When applied to a core already in the inactive state, a shift pulse causes no change in state.

A core in the active, or positive state, is said to contain a binary digit "one," and a core in the negative, or inactive state, is said to contain the digit "zero." When a core shifts from one state to another, a voltage is induced in all of the windings on it. A shift current pulse will have no substantial effect on a core in an inactive state, and substantially no voltage should be induced in its windings.

A magnetic binary shift register has a line of storage cores and another line of temporary storage cores. If a "one" signal is stored in the first storage core, the application of a shift pulse to the line of storage cores will shift out the information stored in the storage cores, and will cause the "one" to be transferred to the first core in the temporary storage line. The application of a shift pulse to the temporary storage line will cause the "one" to be transferred to the second core in the storage line. One cycle of operation thus consists of pulsing first the storage line and then the temporary storage line. At the end of a cycle, a "one" has advanced one stage.

The present invention will now be described with reference to the drawing which is a circuit schematic of one embodiment of the invention.

The pulse source 10, which may be a radar receiver, is connected to the input winding 11 of the magnetic binary core 12 which serves as a magnetic binary switch. The output winding 13 of the core 12 is connected in series with the rectifier 9 to the shift winding 14 of the binary core 16 of a shift pulse generator which supplies shift current pulses for the two shift registers to be described. The core 12 has a reset winding 18 connected to ground, and by the wire 19 to the winding 60 of core I, the other side of winding 60 being connected to the contacts of the switch 22 associated with the binary core H of shift register No. 1.

The core 16 has a feed-back winding 20 connected to the control grid of the triode 21 and to —C (negative bias). The anode of the triode 21 is connected in series with the winding 22 of the core 16 and the winding 23 of the core 17 to the shift bus X. The core 16 also has a winding 24 connected to ground and through the wire 26 to a conventional delay line 27, which, in turn, is connected by the wire 28 to the winding 29 of the core J' of the shift register No. 2. The delay line may be of the type disclosed on page 150 of "Principles of Radar," third edition, published by McGraw-Hill Book Company.

The core 17 has a feedback winding 30 connected to the control grid of the triode 32 and to —C. The anode of the triode 32 is connected in series with the winding 31 of the core 17 and the winding 25 of the core 16 to the shift bus Y.

The shift register No. 1 includes eight stages comprising the eight binary storage cores A–H, the eight temporary storage cores A'–H', and includes the output core I. The shift register No. 2 includes nine stages comprising the nine storage cores J–R and the nine temporary storage cores J'–R'. The cores A–R have the shift windings 34 connected in series to the shift bus X. The cores A'–R' have the shift windings 35 connected in series to shift bus Y. The outer ends of the shift buses are connected together at 36 and to B+ (anode voltage source). The cores J and R' are the first and last respectively, cores in series order of the second register.

The transmitting windings 37 of the cores A–H and J–R are connected through the rectifiers 38 to the receiving windings 39 of the cores A'–H' and J'–R'. The transmitting windings 40 of the cores A'–H' and J'–Q' are connected through the rectifiers 41 to the receiving windings 42 of the cores B–I and K–R.

The receiving windings 45 of the cores A–H are connected to the blades of the double-pole, double-throw switches 22. One end of the line of interconnected contacts of the switches at the switch of core A is connected to the wire 46 which is connected through the rectifier 47 to one end of the winding 48 of the core R', the other end of the winding 48 being connected to ground. The outer contacts of the switches are connected together and in series with the inner contacts of the succeeding switch, the switch associated with core A being first in order. When any switch is thrown in one direction, a reset pulse from the winding 48 having one sense will be delivered to the winding 45 of its associated core. When any of the switches 22 is thrown in the other direction a pulse having the opposite sense will be delivered to the winding of its associated core 45.

The output windings 29 on the cores J'–Q' are connected in series with the rectifier 58 to ground and through the previously described wires 28 and 26 and delay line 27 to the winding 24 of the core 16.

One side of the transmitting winding 50 on the core R' is connected to ground, the other side being connected through the wires 57 and rectifier 25 to the winding 52 on the core J.

The receiving winding 53 on the core I is connected through the rectifier 54 to ground, and to the output terminal of the coder. The output terminal is connected to ground through a resistor 55.

*Operation*

In the stand-by condition, core 12 would be active with respect to pulses from the pulse source 10. Core 16 would be active with respect to pulses received from winding 13 of core 12. Core 17 would be active with respect to pulses on winding 23 received when tube 21 is fired. Triode 21 is biased beyond cutoff. Triode 32 is biased slightly above cutoff. Cores A'–R' are inactive with respect to current pulses in shift bus Y. Core J is active with respect to current pulses in shift bus X. Cores K–R are inactive with respect to current pulses in shift bus X.

A five digit code in which the first two spaces are long and the last two spaces are short will be used as an illustration of the operation of the circuit. For this code, it is desired that cores G, E, D and C shall be active with respect to pulses on shift bus X after a reset pulse is received on wire 46. The switch blades connected to the windings 45 on these cores are therefore thrown to the right. The switch blades connected to the windings 45 on cores H, F, B and A are thrown to the left thus making these cores inactive to current pulses in shift bus X after a reset pulse is received on wire 46. Core I contains the ranging pulse and is permanently wired so as to be active with respect to shift bus X after a reset pulse is received on wire 46.

To start the code, an initiating pulse is received from the pulse source 10 through the winding 11 causing core 12 to change its state. Core 12 is thereafter inactive with respect to pulses received from the pulse source 10 until a reset pulse causes a current pulse to go through winding 18. The change of state of core 12 causes a voltage to be induced in winding 13 and a current pulse goes through winding 14 of core 16 causing it to start changing its state. The flux change will cause a voltage to be induced in the grid winding 20 that causes triode 21 to start conducting. The flow of plate current from triode 21 in winding 22 will initiate regenerative action through winding 20, and the grid potential as well as the plate current will increase rapidly to equilibrium value. The plate current through the winding 22 will cause the core 16 to switch from its active state to its inactive state following which the triode 21 will cease firing since grid voltage will be no longer induced in grid winding 20. The plate current pulse from triode 21 flows through windings 22 on core 16, 23 on core 17 and then through all the windings 34 on cores A–R and at 36 goes to B+. This constitutes a pulse in shift bus X. The active cores A, I, G, E, D and C will be rendered inactive by the shift pulse and at the same time a pulse will be generated in each transmitting winding of the cores G, E, D and C and will pass through the receiving windings 39 of cores G', E', D' and C' of the temporary storage line, placing these temporary storage cores in the active state with respect to a shift pulse to be supplied through the shift windings 35 from the shift bus Y. As core I is rendered inactive by the current pulse in shift bus X it causes a voltage to be induced across winding 53 and a current pulse flows through crystal diode 54 and the output resistor 55. The causes a voltage pulse to appear at the output and constitutes the ranging pulse of the code. At the same time the "one" stored in core J will be shifted by the action of the current pulse into core J', core J becoming inactive.

When the triode 21 of the shift pulse generator fires and draws plate current, the core 17 will be switched to its maximum saturation value by the current through its winding 23. After triode 21 has fired and gone out, the condition of core 17 returns from its maximum saturation value to its maximum residual value, thus generating a pulse across winding 30 of the proper polarity to fire triode 32. When triode 32 fires, its anode current flows through windings 31 of core 17, 25 of core 16 and then through shift bus Y through windings 35 on cores A'–H' and J'–R'. This causes temporary storage cores G', E', D' and C' to become inactive, thereby causing pulses to be generated in windings 40 of these cores and through the rectifiers 41 to receiving windings 42 on cores H, F, E and D. At the same time the current in winding 25 causes core 16 to return to an active state with respect to windings 14 and 24.

At the same time the current pulse in shift bus Y causes core J' to become inactive and through transmitting winding 40 and receiving winding 42, causes core K to become active. The induced voltage in winding 29 of core J' causes a current pulse to flow through wire 28 to the delay line 27 and, after the desired delay, through winding 24 of core 16 and then to ground.

This completes a cycle of operation in which shift bus X is operated by the firing of triode 21, then shift bus Y is operated by the firing of triode 32, and then a pulse is received from temporary storage core J' through winding 24 of core 16 causing triode 21 to fire again in the same manner that it was caused to fire by the initiating pulse as received by core 16 on winding 14. Voltages induced in the windings 29 of cores K'-Q' act during the second-ninth cycles of operation to cause triodes 21-32 to conduct for producing shift pulses.

During the second cycle of operation, the "ones" present in cores H, F, E and D of shift register 1 are advanced to cores I, G, F and E respectively, but no output appears. The "one" in core K of shift register 2 is advanced to core L. During the third cycle of operation, the "ones" present in cores H, F, E and D of shift register 1 are advanced to the output core I and to cores G, F and E respectively. The "one" in core L of shift register 2 is advanced to core M. The "one" in the output core I appears at the output. During the fourth cycle of operation the "ones" present in cores G, F and E of shift register 1 are advanced to cores H, G and F, respectively. The "one" in core M of shift register 2 is advanced to core N. During the fifth cycle, the "ones" in cores H, G and F of shift register 1 are advanced to the output core I and cores H and G respectively. The "one" in core N of shift register 2 is advanced to core O. During the sixth cycle, the "one" in core H is advanced to the output core I and the "one" in core G is advanced to core H. The "one" in core I appears at the output. The "one" in core O of shift register 2 is advanced to core P. During the seventh cycle of the "one" in core H is advanced to the output core I and the "one" in core P is advanced to core Q. During the eighth cycle shift register 1 is inactive and the "one" in core Q of shift register 2 is advanced to core R The "one" in core I appears at the output. During the ninth cycle the "one" in core Q is advanced to core R'. No five digit code of the type described can require more than 9 cycles to be read out, thus adequate time has been provided for the device to operate. During the tenth cycle the "one" in core R' is advanced to core J. Core R' is not linked by a winding 29 as are cores I'-Q', therefore no pulse is fed into delay line 27 and at the end of the tenth cycle there is no current pulse through winding 24 of core 16. Thus no further cycles of operation will occur from the action of the coder. However during the tenth cycle when core R' is changed to the inactive state by the operation of shift bus Y, a reset pulse is induced across winding 48 of core R' and a current pulse is caused to flow through rectifier 47, wire 46, then through switches 22 and winding 60 of core I and then through wire 19 to winding 18 of core 12 and then to ground. This current pulse sets ones in cores I, G, E, D and C and returns core 12 to its active state with respect to pulses from the pulse source. The coder is now completely reset and delivers the desired five pulse code at its output when it receives the next initiating pulse.

More or fewer binaries can be used to provide different codes. The size of the two tubes in the shift pulse register will depend upon the number of cores used but regardless of the number of cores, only two tubes are required.

While one embodiment of the invention has been described for the purpose of illustration, it should be understood that the invention is not limited to the exact apparatus and circuit illustrated as modifications thereof may be suggested by those skilled in the art without departure from the essence of the invention.

What is claimed is:

1. A coder comprising a first magnetic binary shift register having a plurality of stages, a second magnetic binary shift register having an equal plurality of stages plus an additional stage, means for cycling said registers for shifting a code stored in said first register out of said first register, and for shifting a "one" stored in the first stage of said second register through said second register, said means including a shift pulse generator, a signal source connected to said generator, means actuated by a signal from said source for causing said generator to cycle said registers twice only, means connecting all of said stages of said second register with said generator except the last stage in order of said second register for supplying signals to said means of said generator for causing said generator to continue to cycle said registers, and means including switches conecting said last stage of said second register with all of the stages of said first register for resetting the code in said first register.

2. A coder as claimed in claim 1 in which switching means connects the signal source and generator and includes means actuated by the passage of a signal from said source to said generator for preventing another signal from said source from passing to said generator, and in which means connecting said switching means and said last stage of said second register supplies a signal pulse to said switching means when said last stage has been cycled to shift said "one" therefrom, said switching means including means actuated by said signal pulse for causing said switching means to be in condition for passing another signal from said source to said generator.

3. A coder comprising a first shift register having a plurality of storage cores for storing the "ones" of a code, and having a plurality of temporary storage cores, an output circuit including a transmitting winding on the last in series order of said temporary storage cores, a second shift register having a plurality of storage cores one more in number than said storage cores of said first register, and having a plurality of temporary storage cores one more in number than said temporary storage cores of said first register, shift windings on said cores, a shift pulse generator connected to said shift windings for shifting the "ones" through the cores of said first register and for shifting a "one" in the first storage core of said second register through the cores of said second register to the last temporary storage core in series order of said second register, an output winding on said last temporary storage core of said second register, and means including receiving windings on said storage cores of said first register, and switches connected to said last mentioned windings and to said output winding on said last core of said second register for reinserting a code in the storage cores of said first register.

4. A coder as claimed in claim 3 in which a signal source is connected to said generator, said generator including means using a signal from said source to energize said generator to supply a single shift pulse to said storage cores and then to supply a single shift pulse to said temporary storage cores, in which switch means is connected between said source and generator and is actuated by the passage of a signal from said source to prevent the passage of another signal from said source to said generator, and in which said output winding on said last core of said second register is connected to said switch means for supplying a signal thereto for actuating said switch means to again pass a signal from said source to said generator.

5. A coder as claimed in claim 4 in which the switch means is a magnetic binary core having an output winding connected to said generator, and having input windings connected to said source and to said output winding on said last core of said second register.

6. A coder as claimed in claim 5 in which other output windings are provided on all of said temporary storage cores of said second register except said last core thereof and which are connected to said generator to supply signals thereto for energizing said generator to supply shift pulses to said shift windings.

7. A coder as claimed in claim 3 in which other output windings are provided on all of said temporary storage cores of said second register except said last core thereof and which are connected to said generator to supply signals thereto for energizing said generator to supply shift pulses to said shift windings.

8. A coder as claimed in claim 7 in which a signal source is connected to said generator, said generator including means using a signal from said source to energize said generator to supply a single shift pulse to said shift windings on said storage cores and then to supply a single shift pulse to said temporary storage cores, in which switch means is connected between said source and said generator and is actuated by the passage of a signal from said source to prevent the passage of another signal from said source to said generator, and in which said output winding on said last core of said second register is connected to said switch means.

9. A coder as claimed in claim 3 in which other output windings are provided on all of said temporary storage cores of said second register except said last core thereof, in which a delay line is provided, and in which means including said delay line is provided for connecting the last mentioned windings to said generator to supply signals thereto for energizing said generator to supply shift pulses to said shift windings.

10. A coder as claimed in claim 9 in which said last core of said second register has a transmitting winding thereon, and in which the first storage core of said second register has a receiving winding thereon connected to said last mentioned transmitting winding.

11. A coder as claimed in claim 3 in which said last core of said second register has a transmitting winding thereon, and in which the first storage core of said second register has a receiving winding thereon connected to said last mentioned winding.

References Cited in the file of this patent
UNITED STATES PATENTS

| | | |
|---|---|---|
| 2,649,502 | Odell | Aug. 18, 1952 |
| 2,654,080 | Browne | Sept. 29, 1953 |
| 2,729,807 | Paivinen | Jan. 3, 1956 |